(12) United States Patent
Guo et al.

(10) Patent No.: US 12,038,735 B2
(45) Date of Patent: Jul. 16, 2024

(54) MANUFACTURING PROCESS QUALIFICATION SYSTEM AND METHOD

(71) Applicant: Pratt & Whitney Canada Corp., Longueuil (CA)

(72) Inventors: Changsheng Guo, South Windsor, CT (US); Serafettin Engin, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 65 days.

(21) Appl. No.: 17/721,670

(22) Filed: Apr. 15, 2022

(65) Prior Publication Data
US 2023/0333535 A1     Oct. 19, 2023

(51) Int. Cl.
*G05B 19/4097*     (2006.01)
*G05B 19/4093*     (2006.01)
*G05B 19/418*      (2006.01)

(52) U.S. Cl.
CPC ... *G05B 19/4097* (2013.01); *G05B 19/40937* (2013.01); *G05B 19/41875* (2013.01); *G05B 2219/32368* (2013.01)

(58) Field of Classification Search
CPC .......... G05B 19/4097; G05B 19/40937; G05B 19/41875; G05B 2219/32368
See application file for complete search history.

(56) References Cited

U.S. PATENT DOCUMENTS

| | | | |
|---|---|---|---|
| 6,223,093 B1 * | 4/2001 | Kitamura | ............... G06Q 10/06 700/121 |
| 6,345,209 B1 | 2/2002 | Yu | |
| 10,144,530 B1 | 12/2018 | Erion | |
| 10,466,681 B1 * | 11/2019 | Jones | ............... G05B 19/40937 |
| 10,928,801 B2 | 2/2021 | Jones | |

(Continued)

FOREIGN PATENT DOCUMENTS

| EP | 3885983 A1 | 9/2021 |
|---|---|---|
| WO | 2021122548 A1 | 6/2021 |

OTHER PUBLICATIONS

EP Search Report for EP Appln. No. 23168307.9 dated Aug. 28, 2023.

*Primary Examiner* — Thomas C Lee
*Assistant Examiner* — Ameir Myers
(74) *Attorney, Agent, or Firm* — Getz Balich LLC (57) ABSTRACT

A method for qualifying a manufacturing process for a first component including a common geometric feature includes obtaining manufacturing data for the common geometric feature. The manufacturing data is associated with one or more qualified second components. The one or more qualified second components are different than the first component. Each of the one or more qualified second components include the common geometric feature. The method further includes modeling the manufacturing process for the common geometric feature of the one or more qualified second components using the manufacturing data, modeling the manufacturing process for the common geometric feature of the first component, obtaining manufacturing process parameters for the manufacturing process for the common geometric feature of the one or more qualified second components, and qualifying the manufacturing process for the common geometric feature of the first component.

20 Claims, 7 Drawing Sheets

(56) References Cited

U.S. PATENT DOCUMENTS

| | | | |
|---|---|---|---|
| 11,090,772 B2 | 8/2021 | Guo | |
| 2015/0186457 A1* | 7/2015 | Enomoto | G06F 16/245 |
| | | | 707/769 |
| 2019/0384258 A1* | 12/2019 | Nordell | G05B 19/4097 |
| 2020/0012749 A1 | 1/2020 | Snyder | |
| 2020/0201284 A1* | 6/2020 | Edwards | G05B 19/4097 |
| 2020/0356084 A1* | 11/2020 | Zhu | G05B 23/027 |
| 2023/0195061 A1* | 6/2023 | Gadre | H01L 27/00 |
| | | | 700/159 |

\* cited by examiner

MANUFACTURING PROCESS QUALIFICATION SYSTEM AND METHOD

TECHNICAL FIELD

This disclosure relates generally to component manufacturing processes and more particularly to systems and methods for qualifying component manufacturing processes.

BACKGROUND OF THE ART

The manufacture of components for complex equipment, such as gas turbine engines, may require the performance of one or more manufacturing processes. In some cases, it may be beneficial to "qualify" a manufacturing process for a component in order to demonstrate the ability and consistency of the manufacturing process to reliably produce acceptable components. However, the process for qualifying a component manufacturing process can be expensive and time consuming. There is a need in the art, therefore, for improved qualification systems and methods.

SUMMARY

It should be understood that any or all of the features or embodiments described herein can be used or combined in any combination with each and every other feature or embodiment described herein unless expressly noted otherwise.

According to an aspect of the present disclosure, a method for qualifying a manufacturing process for a first component including a common geometric feature includes obtaining manufacturing data for the common geometric feature. The manufacturing data is associated with one or more qualified second components. The one or more qualified second components are different than the first component. Each of the one or more qualified second components include the common geometric feature. The method further includes modeling the manufacturing process for the common geometric feature of the one or more qualified second components using the manufacturing data, modeling the manufacturing process for the common geometric feature of the first component, obtaining manufacturing process parameters for the manufacturing process for the common geometric feature of the one or more qualified second components, and qualifying the manufacturing process for the common geometric feature of the first component. Qualifying the manufacturing process includes modifying the manufacturing process to include the manufacturing process parameters.

In any of the aspects or embodiments described above and herein, the common geometric feature may be a surface.

In any of the aspects or embodiments described above and herein, the step of qualifying the manufacturing process for the common geometric feature may include determining one or both of a process capability (Cpk) or a process performance (Ppk) for the common geometric feature.

In any of the aspects or embodiments described above and herein, the method may further include indexing the common geometric feature in a database by assigning the common geometric feature a unique identification code.

In any of the aspects or embodiments described above and herein, the method may further include storing the manufacturing data associated with the common geometric feature of the one or more qualified second components as a dataset in the database and assigning the unique identification code to the dataset.

In any of the aspects or embodiments described above and herein, the method may further include manufacturing the first component by applying the qualified manufacturing process to the common geometric feature of the first component.

In any of the aspects or embodiments described above and herein, the method may further include collecting the manufacturing data for the at least one geometric feature of the first component manufactured using the qualified manufacturing process.

In any of the aspects or embodiments described above and herein, the method may further include establishing physics equivalence between modeled manufacturing process for the common geometric feature of the first component the modeled manufacturing process for the common geometric feature of the one or more qualified second components.

In any of the aspects or embodiments described above and herein, the manufacturing process may include one or more of a turning process, a milling process, a grinding process, a drilling process, a broaching process, a gear cutting process, or a wire electrical discharge machining (WEDM) process.

According to another aspect of the present disclosure, a non-transitory, computer-readable medium includes instructions, which when executed by a computing device, cause the computing device to perform operations including obtaining manufacturing data for the common geometric feature. The manufacturing data is associated with one or more qualified second components. The one or more qualified second components are different than the first component. Each of the one or more qualified second components includes the common geometric feature. The instructions, which when executed by a computing device, further cause the computing device to perform operations including modeling the manufacturing process for the common geometric feature of the one or more qualified second components using the manufacturing data, modeling the manufacturing process for the common geometric feature of the first component, obtaining manufacturing process parameters for the manufacturing process for the common geometric feature of the one or more qualified second components, and qualifying the manufacturing process for the common geometric feature of the first component. Qualifying the manufacturing process includes modifying the manufacturing process to include the manufacturing process parameters.

In any of the aspects or embodiments described above and herein, the common geometric feature may be a surface.

In any of the aspects or embodiments described above and herein, the operation of qualifying the manufacturing process for the common geometric feature may include determining one or both of a process capability (Cpk) or a process performance (Ppk) for the common geometric feature.

In any of the aspects or embodiments described above and herein, the instructions may further cause the computing device to perform operations including indexing the common geometric feature in a database by assigning the common geometric feature a unique identification code.

In any of the aspects or embodiments described above and herein, the instructions may further cause the computing device to perform operations including storing the manufacturing data associated with the common geometric feature of the one or more qualified second components as a dataset in the database and assigning the unique identification code to the dataset.

In any of the aspects or embodiments described above and herein, the instructions may further cause the computing device to perform operations including establishing physics equivalence between modeled manufacturing process for the common geometric feature of the first component the modeled manufacturing process for the common geometric feature of the one or more qualified second components.

According to another aspect of the present disclosure, a method for qualifying a manufacturing process for a first component including at least one common geometric feature includes storing manufacturing data for the common geometric feature in a database and indexing the manufacturing data with the at least one common geometric feature using a unique identification code and defining the first component using a three-dimensional component CAD model. The three-dimensional component CAD model includes the common geometric feature. The method further includes identifying the manufacturing data for the common geometric feature of the first component using the unique identification code for the common geometric feature, modeling the manufacturing process using the manufacturing data, modeling the manufacturing process for the at least one common geometric feature of the first component, establishing physics equivalence between modeled manufacturing process for the common geometric feature of the first component the modeled manufacturing process using the manufacturing data, obtaining manufacturing process parameters from the manufacturing data, and qualifying the manufacturing process for the common geometric feature of the first component. Qualifying the manufacturing process includes modifying the manufacturing process to include the manufacturing process parameters.

In any of the aspects or embodiments described above and herein, the manufacturing data may include one or more of on-machine measurement data, process monitoring data, or quality inspection data.

In any of the aspects or embodiments described above and herein, the step of qualifying the manufacturing process for the common geometric feature may include determining one or both of a process capability (Cpk) and a process performance (Ppk) for the common geometric feature.

In any of the aspects or embodiments described above and herein, the method may further include storing the manufacturing data associated with the common geometric feature of the one or more qualified second components as a dataset in the database and assigning the unique identification code to the dataset.

In any of the aspects or embodiments described above and herein, defining the first component using the three-dimensional component CAD model may include generating a CAD-based surface representation of the common geometric feature and assigning the unique identification code to the CAD-based surface representation.

The present disclosure, and all its aspects, embodiments and advantages associated therewith will become more readily apparent in view of the detailed description provided below, including the accompanying drawings.

DETAILED DESCRIPTION

Figure 1:
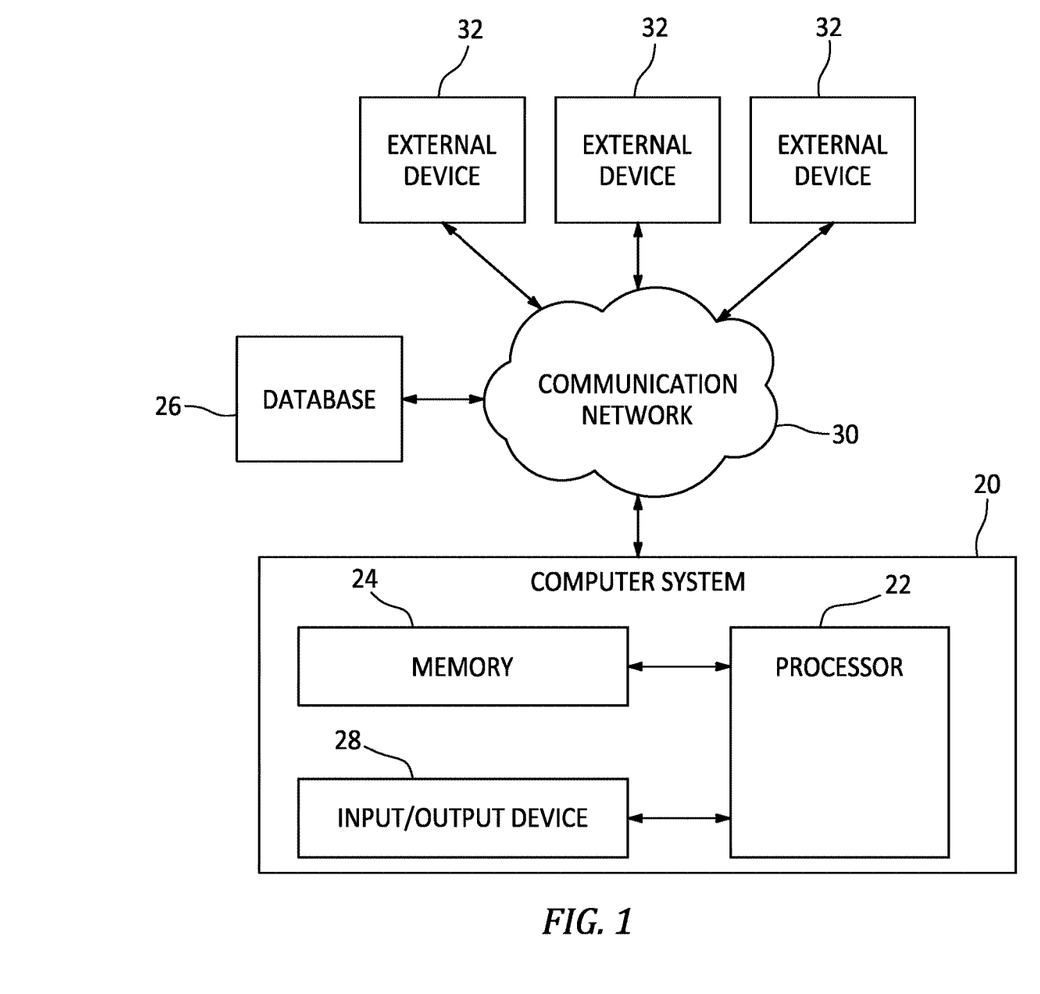
FIG. 1 illustrates a schematic block diagram of an exemplary computer system, in accordance with one or more embodiments of the present disclosure.

Referring to FIG. 1, a diagram of an exemplary computer system 20 is shown. The computer system 20 may be configured to implement one or more aspects of the present disclosure, however, the present disclosure is not limited to this particular computer system embodiment. The computer system 20 includes a processor 22 in signal communication with memory 24. The processor 22 may be any type of computing device, computational circuit, or processing circuit capable of executing a series of instructions that are stored in memory 24. The processor 22 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 24 may represent one or more algorithms for controlling the aspects of the computer system 20, and the stored instructions are not limited to any particular form (e.g., program files, system data, buffers, drivers, utilities, system programs, etc.) provided they can be executed by the processor 22. The memory 24 may be a non-transitory computer readable storage medium configured to store instructions which, when executed by the processor 22, cause the processor 22 to perform or cause the performance of certain functions. The memory 24 may be a single memory device or a plurality of memory devices. A memory device may include a storage area network, network attached storage, as well as a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the computer system 20 may be achieved by the use of hardware, software, firmware, or any combination thereof.

In various embodiments, the computer system 20 may include a database 26 in signal communication with the processor 22. In various embodiments, the database 26 may be located external to the computer system 20 and in signal communication with the computer system 20 via any wired or wireless protocol. In various other embodiments, the database 26 may be integral to the computer system 20. For example, the database 26 may be integrated with the memory 24. In various embodiments, the computer system 20 may also include input (e.g., a keyboard, a touch screen, etc.) and output devices (e.g., a monitor, sensor readouts, data ports, etc.) (hereinafter input/output device 28), in signal communication with the processor 22, that enable a user to input instructions, receive data, etc.

The computer system 20 may be connected to a communication network 30. The communication network 30 may include any suitable electronic communication network or combination of electronic communication networks including, but not limited to, wired and/or wireless local area networks, internet-based networks, cloud-based storage and communication networks, and the like. The communication network 30 may allow remote electronic communications between the computer system 20 and one or more devices such as the database 26 and/or one or more external devices 32 including, for example, computer workstations, manufacturer-based computers such as computer-aided manufacturing (CAM) computers, conventional and non-conventional manufacturing equipment such as, but not limited to, multi-axis milling equipment, grinding equipment, additive manufacturing equipment, component casting equipment, and component scanning equipment, etc.

Figure 2:
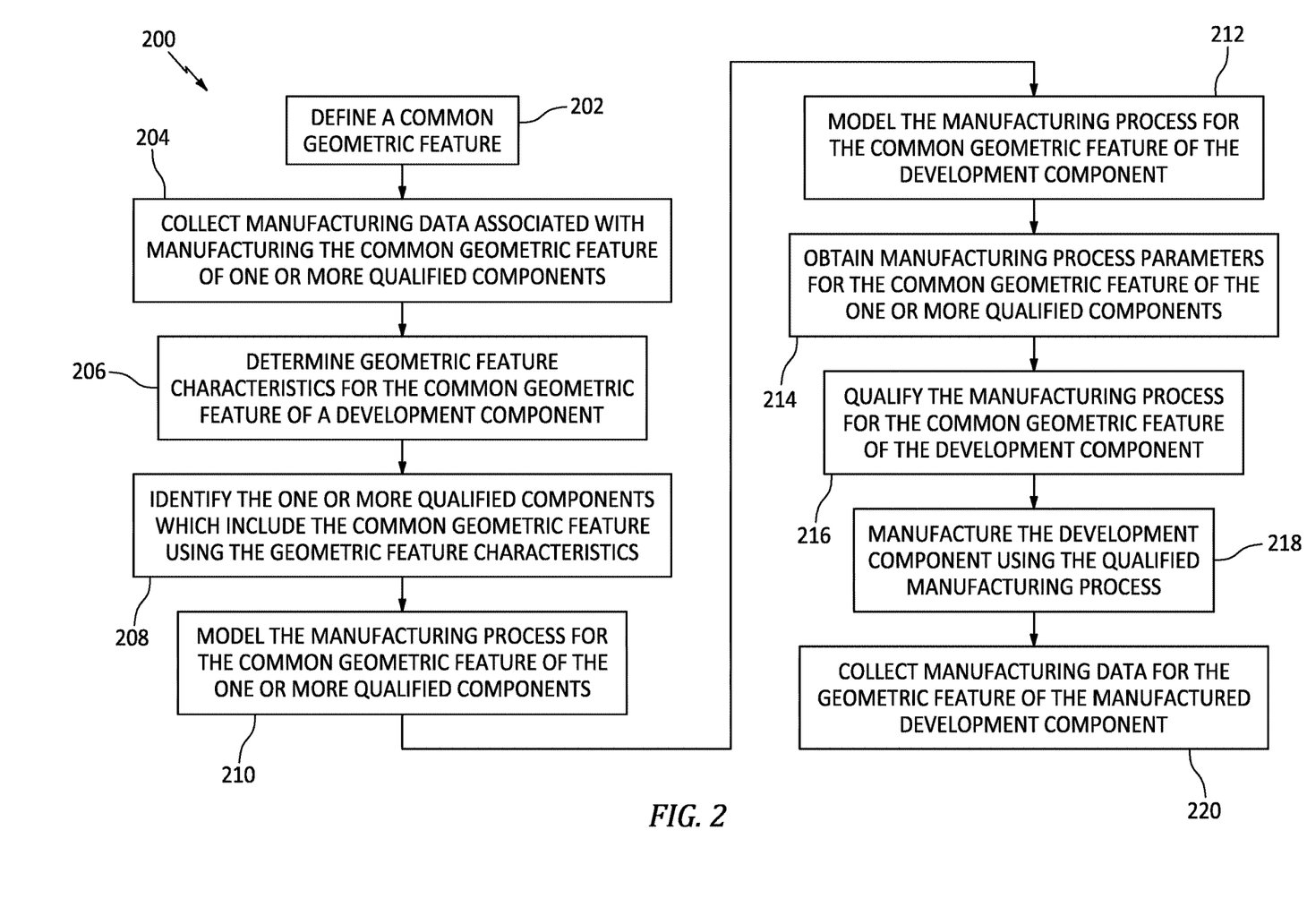
FIG. 2 illustrates a flowchart depicting a method for qualifying a manufacturing process for a component, in accordance with one or more embodiments of the present disclosure.
Figure 3:
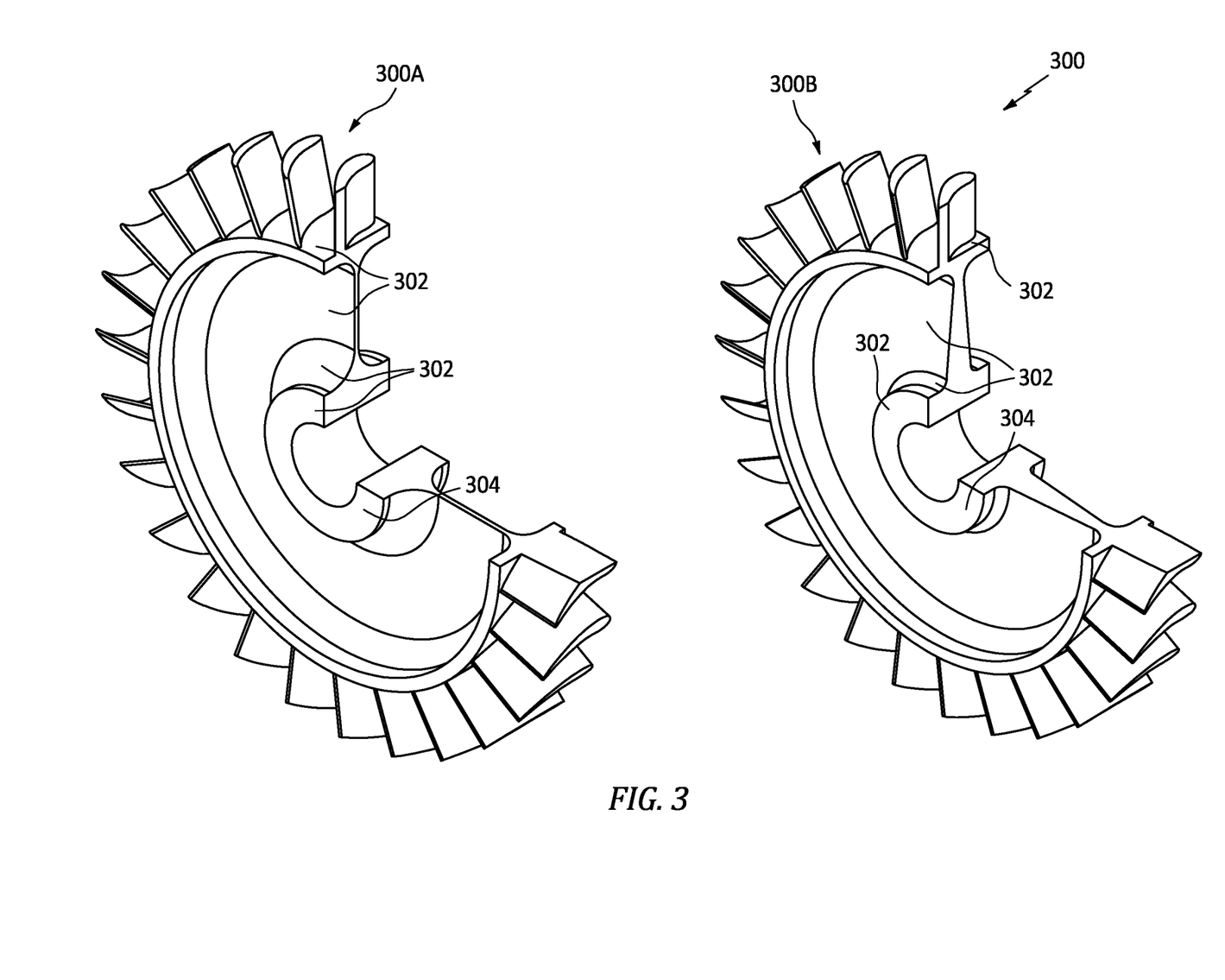
FIG. 3 illustrates a cutaway, perspective views of exemplary components, in accordance with one or more embodiments of the present disclosure.

Referring to FIGS. 1-3, the present disclosure includes a method 200 for qualifying a manufacturing process for a component. For ease of description, the method 200 is described below with reference to the computer system 20 of FIG. 1. The method 200, however, may alternatively be performed with other computer system configurations. Unless otherwise noted herein, it should be understood that the steps of method 200 are not required to be performed in the specific sequence in which they are discussed below and, in various embodiments, the steps of method 200 may be performed separately or simultaneously. Further, it should be understood that not all of the steps of the method 200, discussed below, may be required unless otherwise described herein.

FIG. 3 illustrates cutaway, perspective views of exemplary components 300 including a first component 300A and a second component 300B. The first component 300A and the second component 300B of FIG. 3 are bladed disks (e.g., rotors) which may be used, for example, in a compressor or turbine of a gas turbine engine. However, it should be understood that the present disclosure is not limited to any particular type of component 300. Each component 300, such as the first component 300A and the second component 300B, includes a plurality of geometric features 302. The geometric features 302 may include, but are not limited to, surfaces, edges, points, lines, planes, volumes, etc. of the components 300, 300A, 300B. For ease of description, the geometric features 302 will be described herein with respect to surfaces, however, it should be understood that geometric features 302 according to the present disclosure may include other types of component geometric features, as described above.

As can be seen in FIG. 3, the first component 300A and the second component 300B are different from one another. In other words, the first component 300A includes one or more geometric features 302 which are different from or otherwise not included in the second component 300B, and vice versa. However, the first component 300A and the second component 300B also include geometric features 302 which are common to both the first component 300A and the second component 300B, i.e., common geometric features 304. As used herein, the term "common geometric feature" refers to a geometric feature (e.g., a surface) of a component 300 or component model which is the same or similar for two or more different components 300 based on one or more predetermined similarity rules. For example, in some embodiments, the common geometric feature 304 may include one or more geometric feature characteristics (e.g., diameter, thickness, width, etc.) which are the same or within a predetermined geometric characteristic threshold for two or more different components 300. In some embodiments, the at least one common geometric feature 304 may additionally or alternatively be determined or otherwise identified based on similar geometric feature characteristics such as, but not limited to, fit, form, function, position, tolerance, surface finish, geometric feature angles, radius of curvature, etc. for two or more different components 300. In some embodiments, the common geometric feature 304 of two or more components 300 may be defined by a geometric feature characteristic such as a common (i.e., same) material or materials (e.g., metal, metal alloy, composite material, etc.) for the common geometric feature 304. In some embodiments, the common geometric feature 304 for two or more different components may be identical or substantially identical. Any number of the geometric features 302 of a component 300 may be identified as common geometric features 304. For example, component A may include a first geometric feature 302 which is a common geometric feature with component B and component C, a second geometric feature 302 which is a common geometric feature with component C and component D but not component B, a third geometric feature 302 which is a common geometric feature with component D and component E but not component B or component C, etc.

In Step 202, the common geometric feature 304 may be defined for two or more different components 300. Each of the geometric features 302 of a component 300 may be identified and described based on the one or more geometric feature characteristics of each geometric feature 302. Identification of each geometric feature 302 may include indexing each geometric feature 302 of a component 300. For example, in some embodiments, each geometric feature 302 of a component 300 may be assigned a unique identification code, as will be discussed in further detail. Indexing each geometric feature 302 may allow common geometric features 304 to be identified for two or more different components 300. For example, component A and different component B may each include a common geometric feature 304 having a unique identification code associated with each of component A and component B. Defining a common geometric feature 304, for example, by indexing and/or describing the geometric features 302 for a component 300, may be accomplished using an industrial standard such as the Quality Information Framework (QIF) and/or using Universally Unique Identifiers (UUID), however, the present disclosure is not limited to any particular standard or system for defining a common geometric feature 304.

Figure 4:
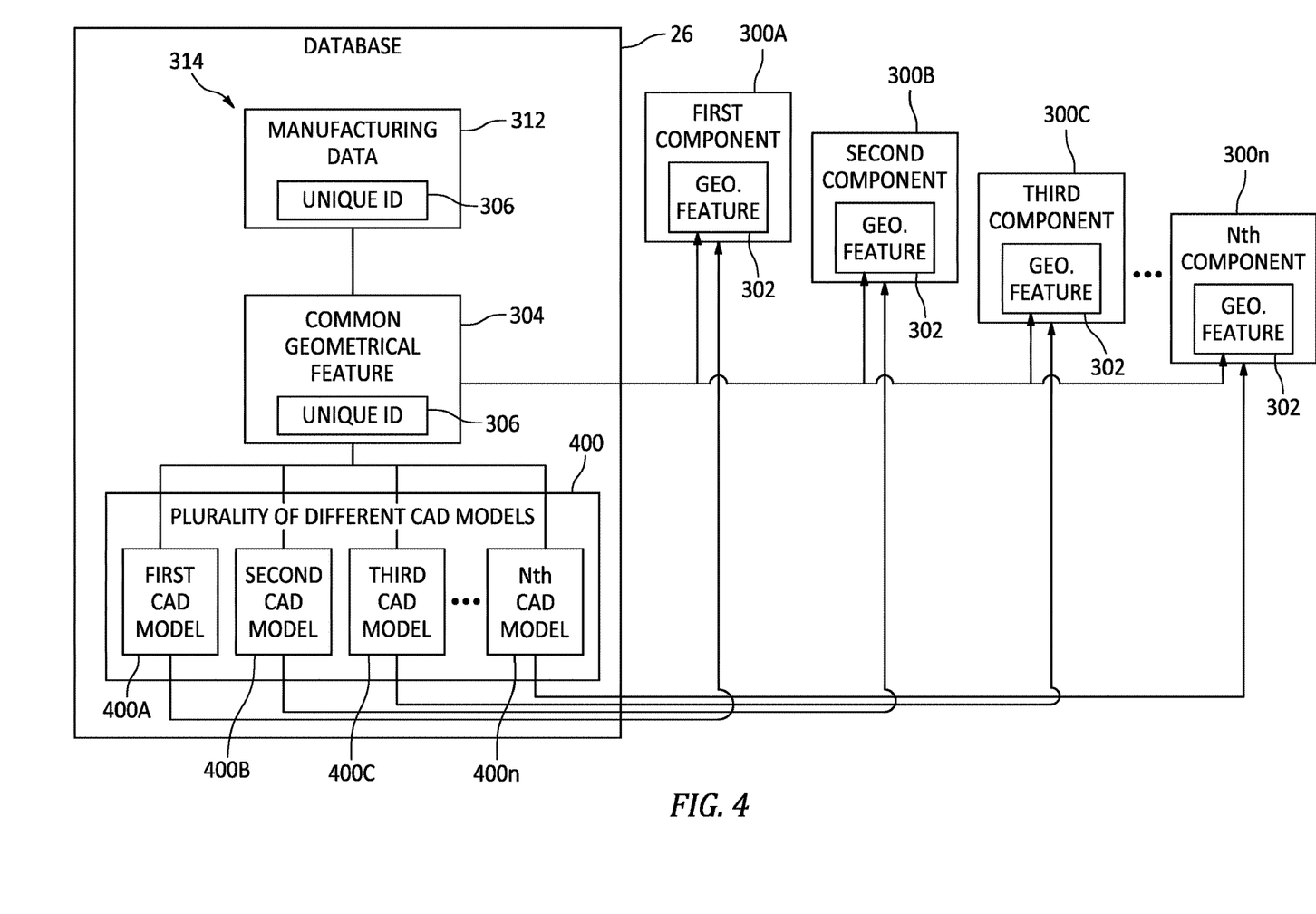
FIG. 4 illustrates a schematic block diagram including portions of the computer system of FIG. 1 and a plurality of components, in accordance with one or more embodiments of the present disclosure.

Referring to FIGS. 2-8, in one non-limiting example, Step 202 may include receiving, generating, or otherwise defining one or more different three-dimensional component computer aided design (CAD) models 400 (e.g., boundary definition models), which represent one or more different respective components 300. The CAD models 400 may be received, generated, or otherwise defined, for example, with the computer system 20 using a suitable CAD or CAM system, platform, or software (which may also be referred to herein as a "CAD environment"). The present disclosure is not limited to any particular CAD or CAM system, platform, or software. The CAD models 400 may be stored in memory 24, the database 26 as shown in FIG. 4, or one or more external device 32 for use by the computer system 20. The CAD models 400 may be stored as a single file or as multiple files which are readable by compatible CAD software.

Figures 5, 6:
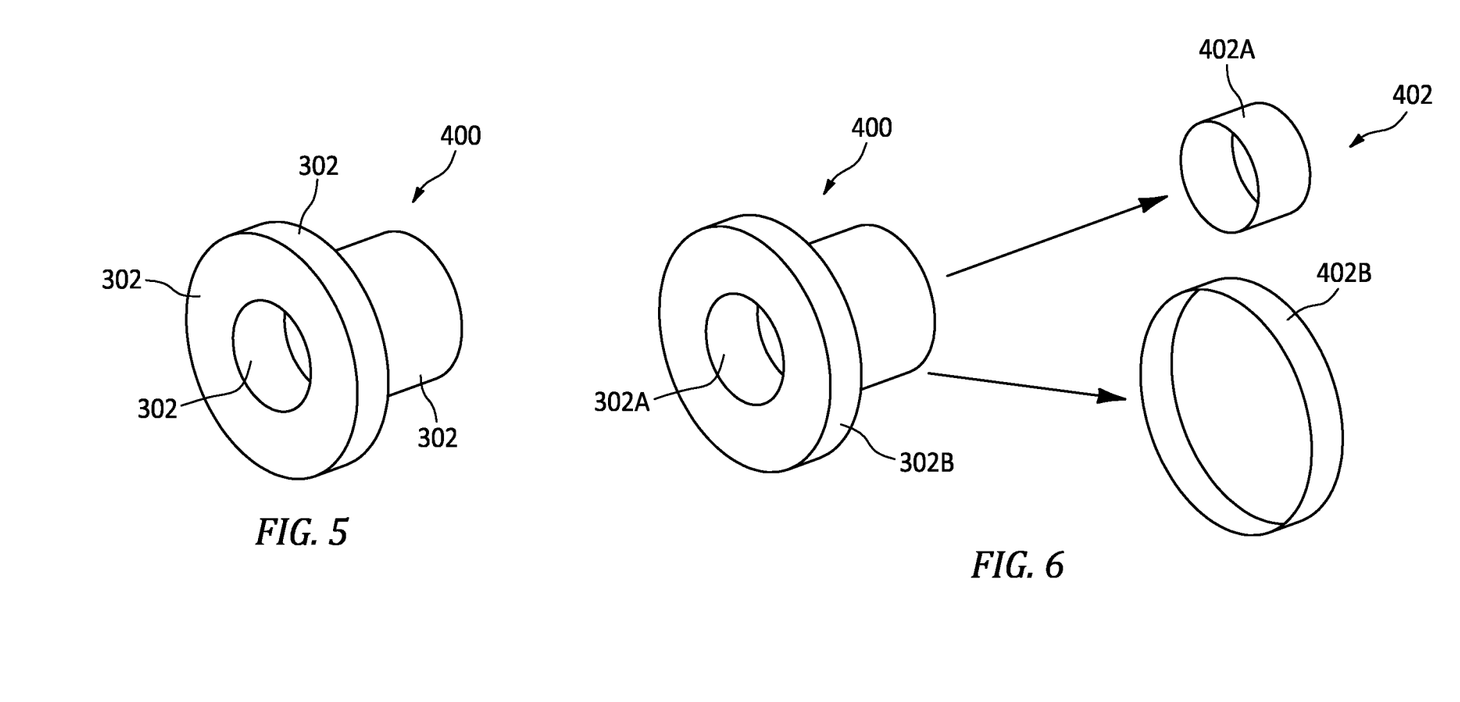
FIG. 5 illustrates a perspective view of a three-dimensional component CAD model, in accordance with one or more embodiments of the present disclosure.
FIG. 6 illustrates perspective views of CAD-based surface representations extracted from surfaces of the CAD model of FIG. 5, in accordance with one or more embodiments of the present disclosure.

FIG. 5 illustrates an exemplary CAD model 400 which includes geometric features 302 defined in the CAD model 400 by a respective plurality of component surfaces. The geometric features 302 may, for example, represent exterior and/or interior surfaces of the CAD model 400 for a modeled component 300 (e.g., the geometric features 302 of the CAD model 400 may be representative of the geometric features 302 of a component 300). Accordingly, the CAD model 400 may include geometric features 302 of a modeled component 300 which may be used for manufacturing and/or assembly of the modeled component 300.

As shown in FIG. 6, in some embodiments, Step 202 may include extracting surface information from each of the geometric features 302 of the CAD model 400 and generating CAD-based surface representations 402 of each of the geometric features 302 of the geometric features 302 of the CAD model 400. The CAD-based surface representation 402 may be a three-dimensional surface representation as shown, for example, in FIG. 6, which illustrates a first surface representation 402A of a cylindrical surface extracted from a bore hole of the CAD model 400. In one example of the present disclosure method 200, as illustrated in FIG. 6, Step 202 may include generating the first surface representation 402A of a geometric feature 302A of the CAD model 400, generating a second surface representation 402B of a geometric feature 302B of the CAD model 400, and generating additional surface representations 402 for each additional geometric feature 302 of the CAD model 400. The surface representations 402 may be generated in the CAD environment and may be a unique CAD model which is independent of the CAD model 400 for a modeled component 300. In some embodiments, each surface representation 402 may be stored in the CAD environment, independent of the CAD model 400.

Figure 7:
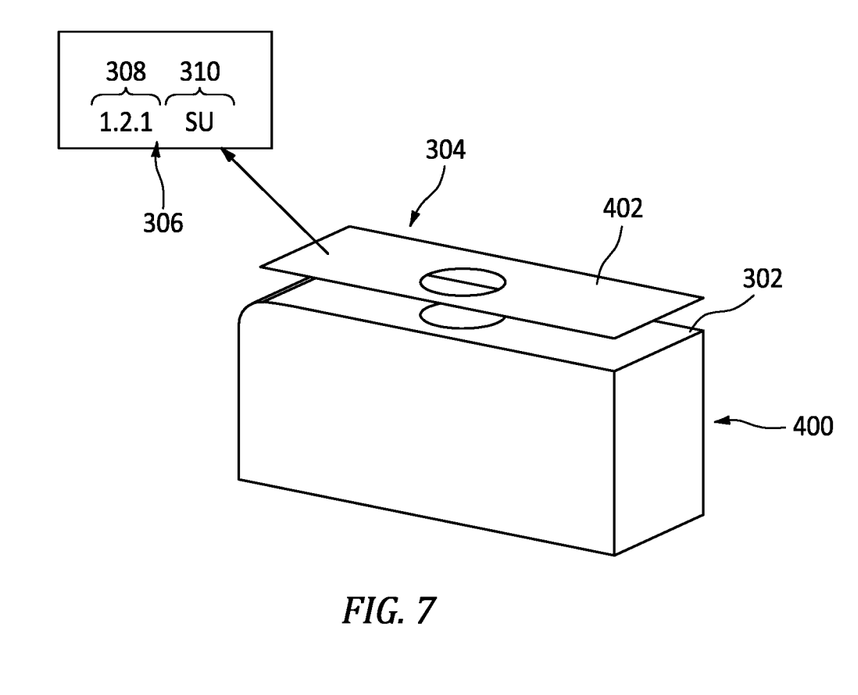
FIG. 7 illustrates a perspective view of an exemplary CAD model with a geometric feature defined by a surface representation extracted from a surface of the exemplary CAD model and including a unique identification code assigned to the geometric feature, in accordance with one or more embodiments of the present disclosure.

As previously discussed, identification of each geometric feature 302 may include indexing each geometric feature 302 of a component 300. As shown in FIG. 7, each geometric feature 302 may be assigned a unique identification code 306. Assigning the unique identification code 306 to the geometric feature 302 may include, for example, assigning the unique identification code 306 to the surface representation 402 of a CAD model 400, which surface representation 402 is representative of the geometric feature 302. The unique identification code 306 for a geometric feature 302 may include index number 308 and index code 310 elements which may be determined based on a predetermined coding nomenclature. For example, the index number 308 may be used to identify a logical or hierarchical relationship between elements of a component geometric feature, a component, a module, or a broader system or part including multiple components. The index code 310 may indicate a description or purpose for the geometric feature 304. Thus, a particular geometric feature 302 which is common to two or more components 300, i.e., a common geometric feature 304, may be associated with the unique identification code 310 which, for example, may provide digital traceability of the common geometric feature 304 throughout a plurality of different CAD models 400 which are representative of respective different components 300 and which include the common geometric feature 304.

In Step 204, manufacturing data 312 for the common geometric feature 304 may be collected. Manufacturing data 312 for each geometric feature 302 (e.g., which may or may not be a common geometric feature 304) of a component 300 may be collected during the manufacturing of the respective component 300. Because the common geometric feature 304 may be indexed (e.g., using a unique identification code 310), as discussed above, the manufacturing data 312 for the common geometric feature 304 may be collected and retained across a plurality of different components 300 which include the common geometric feature 302. Manufacturing data 312 may include any useful data associated with the common geometric feature 304 which may be collected during manufacturing of a component 300. The manufacturing data 312 may include geometric feature characteristics of the common geometric feature 304. The manufacturing data 312 may include manufacturing process instructions such as computer numerical control (CNC) G-code or M-code. The manufacturing data 312 may include enterprise resource planning (ERP) and/or manufacturing execution system (MES) data. The manufacturing data 312 may include product lifecycle management data. The manufacturing data 312 may include process monitoring data, for example, spindle power, vibration, coolant temperature, voltages, machining tools used, machining tool history, actual manufacturing time for the geometric feature 302, etc. The manufacturing data 312 may include on-machine measurements of various geometric characteristics of the common geometric feature 304 which may be measured/probed during various manufacturing steps. The manufacturing data 312 may include inspection data of the common geometric feature for manufactured components 300 as well as the number of inspections performed for the common geometric feature 304 and acceptance rates for the common geometric feature 304.

With reference to FIG. 4, Step 204 may further include storing the manufacturing data 312. The manufacturing data 312 associated with the common geometric feature 304 may be stored as a dataset 314, for example, in the database 26, memory 24, the one or more external devices 32, or any other suitable data storage medium (see FIG. 1). The dataset 314 may be assigned the same unique identification code 306 as the common geometric feature 304 (e.g., as represented by the surface representation 402). Accordingly, the dataset 314 and the common geometric feature 304 may be linked in the CAD environment by the unique identification code 306.

FIG. 4 illustrates a schematic block diagram describing an exemplary relationship between the common geometric feature 304, components 300, CAD models 400, and manufacturing data 312. As shown in FIG. 4, the database 26 may include a plurality of different CAD models 400A-*n* retained in the database 26 (e.g., the CAD environment). Each of the plurality of different CAD models 400A-n may share at least one common geometric feature such as the common geometric feature 304. The common geometric feature 304 is identified and indexed using the unique identification code 306. Manufacturing data 312 for the common geometric feature 304 is stored as the dataset 314 in the database 26. The dataset 314 is linked with the common geometric feature 304 using the unique identification code 306. Each of the plurality of different CAD models 400A-*n* is representative of a respective different component 300A-*n*. Each of the different components 300A-*n* include the geometric feature 302 which is the common geometric feature 304.

The manufacture of components, such as the component 300, may require the performance of one or more manufacturing processes. In some cases, it may be beneficial or necessary to "qualify" a manufacturing process for a component in order to demonstrate the consistency of the manufacturing process with respect to the component and to reduce the need for component inspections. The qualification of a manufacturing process may include a statistical analysis of the manufacturing process which demonstrates that the manufacturing process satisfies predetermined acceptance criteria for the manufactured component. Qualification of a manufacturing process may include analysis of geometrical criteria of the component and, more importantly, the effect of the manufacturing process on the component material itself. In particular, qualification of a manufacturing process may include determining that subsurface material properties of the manufactured component are within predetermined specifications. Application of manufacturing processes which remove component material can adversely impact the subsurface material properties (e.g., the microstructure) of a component, and thereby result in a reduce lifecycle for the component.

Figure 8:
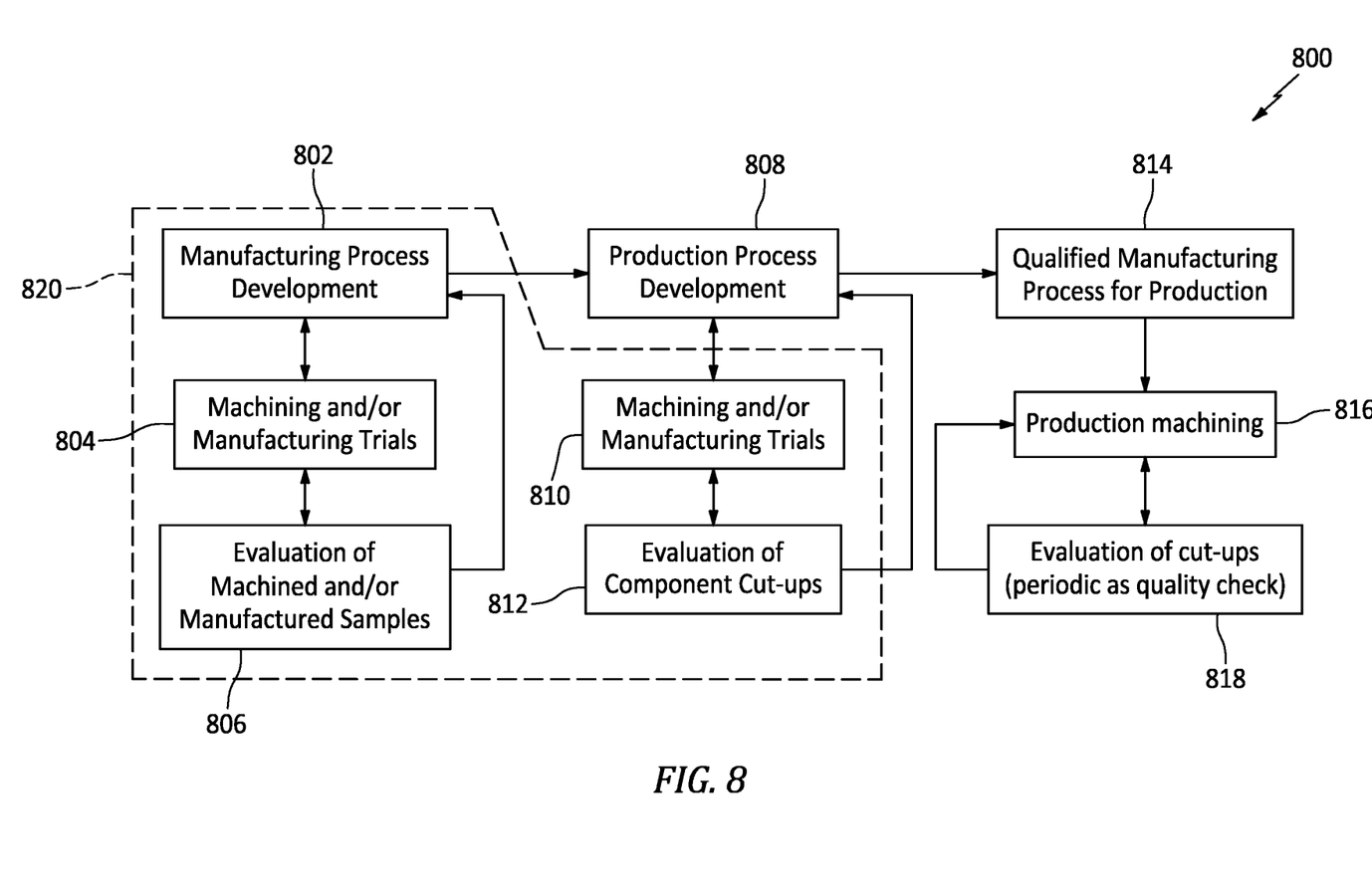
FIG. 8 illustrates a flowchart depicting a process for qualifying a manufacturing process, in accordance with one or more embodiments of the present disclosure.

FIG. 8 illustrates a flowchart including exemplary sequence 800 of steps which may be performed for qualifying a manufacturing process for a component, such as the component 300. For example, initial manufacturing process development 802 may include generally determining the appropriate tooling, machines, and process parameters which may be needed to manufacture a particular component. The manufacturing process development 802 may consider past experiences with similar components, materials, and/or manufacturing equipment as well as vendor recommendations. Machining trials 804 may be performed on sample workpieces which include features, such as size, shape, material, etc., which are representative of a desired component. Evaluation of the sample workpieces may include examination of subsurface quality indications including, but not limited to, residual stresses, grain distortion, and/or white etch layer(s). The machined samples may be evaluated 806 to determine whether selected manufacturing equipment and/or processes may be acceptable for the desired component. Based on the manufacturing process development 802, subsequent production process development 808 may include determining specific production requirements including, for example, manufacturing machines, tooling, fixtures, process parameters, computer numerical control (CNC) programming, etc. Machining trials 810 may be performed to manufacture actual component hardware (e.g., prototypes) for the desired component during the production process development 808. Evaluation 812 of cut-ups of the component hardware may be used to refine the production process development 808. For example, subsurface examination of machined coupons, machined samples, and periodic cut-ups from may be analyzed. Following completion of the production process development 808, an approved (e.g., qualified) manufacturing process 814 may be used to manufacture 816 the component. The qualified manufacturing process 814 includes the specific manufacturing process parameters for the component such as manufacturing tool specifications, tool speed, feed rate, machining and/or cutting depth, etc. Periodic evaluations of manufactured components (e.g., component cut-ups) may be performed as quality checks 818. The qualification of a manufacturing process for a component can be time consuming and expensive. Systems and methods according to the present disclosure may allow at least some steps (e.g., steps within the dashed line 820) of the exemplary sequence 800 of steps to be avoided or substantially simplified.

In Step 206, the geometric feature characteristics of the common geometric feature 304 may be determined for a component 300 for which a manufacturing process has not yet been qualified (hereinafter a "development component" 300). Step 206 may include determining the geometric feature characteristics for each geometric feature 302 of the development component 300.

In Step 208, one or more components 300, other than the development component 300, which include the common geometric feature 304 may be identified. Step 208 may include querying the database 26 to identify one or more components 300 which include the common geometric feature 304 and which are associated with a manufacturing process that has been qualified for the particular common geometric feature 304 (hereinafter "qualified components" 300). Identifying qualified components 300 including the common geometric feature 300 may include querying the database 26 for geometric features 302 which include the geometric feature characteristics determined for a geometric feature 302 of the development component 300. In some embodiments, for example, where the geometric features 302 of the development component 300 have been assigned the unique identification code 306, identifying qualified components 300 may additionally or alternatively include querying the database 26 for any geometric features 302 having the same unique identification code 306 (e.g., common geometric features 304). In the event that no common geometric feature 304 is identified for a geometric feature 302 of the development component 300, the geometric feature 302 of the development component 300 may instead be qualified using conventional processes.

In Step 210, one or more manufacturing processes may be modeled using the manufacturing data 312 associated with the common geometric feature 304 of the qualified components 300 identified in Step 208. One or more manufacturing processes including, but not limited to, a turning process, a milling process, a grinding process, a drilling process, a wire electrical discharge machining (WEDM) process, an additive manufacturing process, a casting process, an injection molding process, etc. A representation of the manufacturing processes may be modeled, by the computer system 20 for example, in a virtual (e.g., digital) environment which closely represents the physical system (e.g., component, manufacturing system, etc.) by accounting for factors such as, but not limited to, kinematics, static and dynamic behaviors, component surface characteristics, geometry, process results such as force, torque, power, deflection, temperature, vibration, and the like. As an example, a grinding process model may include process parameters such as grinding wheel diameter, workpiece size and shape, speed of a component workpiece relative to grinding equipment, thermal conductivity of a component workpiece material, thermal diffusivity of a component workpiece material, etc.

In Step 212, the one or more manufacturing processes may be modeled for the common geometric feature 304 of the development component 300. Similar to the modeling process of Step 210, a representation of the manufacturing processes may be modeled, by the computer system 20 for example, in a virtual (e.g., digital) environment which closely represents the physical system (e.g., component, manufacturing system, etc.) by accounting for factors such as, but not limited to, kinematics, static and dynamic behaviors, component surface characteristics, geometry, process results such as force, torque, power, deflection, temperature, vibration, and the like. The results of the model discussed in Step 210 and the model for the one or more manufacturing processes for the common geometric feature 304 of the development component 300 may be compared to determine whether the qualified one or more manufacturing processes for the common geometric feature 304 of the qualified components 300 are likely to produce similar results for the common geometric feature 304 of the development component 300 (e.g., the qualified manufacturing processes are acceptable for the common geometric feature 304 of the development component 300). In some embodiments, Step 212 may include establishing physics equivalence between the model of Step 210 and the model of Step 212. Equivalence or similarity in manufacturing parameters such as, but not limited to, component material temperatures, pressure at the tool-component interface, manufacturing process parameters, etc. may be used to determine that the models have physics equivalence. Establishing physics equivalence between the models may demonstrate that the manufacturing processes for the common geometric feature 304 of the one or more qualified components 300 will have a same or substantially similar physical performance when applied to the common geometric feature 304 of the development component 300, thereby indicating an equal or greater chance of successfully processing the common geometric feature 304 of the development component 300. In the event that the qualified one or more manufacturing processes for the common geometric feature 304 of the qualified components 300 does not produce similar results for the common geometric feature 304 of the development component 300 or physics equivalence cannot be established, the common geometric feature 304 of the development component 300 may instead be qualified using conventional processes.

In Step 214, manufacturing process parameters are obtained from the manufacturing data 312 for the common geometric feature 304 of the one or more qualified components 300. In Step 216 the manufacturing process for the common geometric feature 304 of the development component 300 is qualified. The qualified manufacturing process for the common geometric feature 304 of the development component 300 may be developed or modified to include some or all of the manufacturing process parameters obtained from the manufacturing data 312 for the common geometric feature 304 of the one or more qualified components 300.

In some embodiments, Step 216 may include determining a process capability (Cpk) and/or a process performance (Ppk) for the common geometric feature 308. For example, Step 216 may include querying the manufacturing data 312 associated with the common geometric feature 304 to determine the Cpk and/or Ppk for the common geometric feature 304. The Cpk is a statistical tool which may be used to measure the ability of a manufacturing process to produce components or component geometric features within specification limits with a high confidence. Ppk is another statistical tool which may be used to determine how the actual manufacturing process has performed over a period of time with respect to producing components or component geometric features within specification limits with a high confidence. For example, a Cpk or Ppk value of 1.33 for the common geometric feature 304 may indicate that 99.99% of instances of the common geometric feature 304 are within or likely to be within specification limits, a Cpk or Ppk value of 1.2 for the common geometric feature 304 may indicate that 99.97% of instances of the common geometric feature 304 are within or likely to be within specification limits, a Cpk or Ppk value of 1.0 for the common geometric feature 304 may indicate that 99.7% of instances of common geometric feature 304 are within or likely to be within specification limits, etc. A Cpk or Ppk value above a predetermined threshold value may confirm that the manufacturing process for the common geometric feature 304 of the one or more qualified components 300 is acceptable for use in manufacturing the common geometric feature 304 of the development component 300.

In Step 218, the development component 300 may be manufactured using the qualified manufacturing process which may include, but is not limited to, one or more of a turning process, a milling process, a grinding process, a drilling process, a broaching process, a gear cutting process, a wire electrical discharge machining (WEDM) process, an additive manufacturing process, a casting process, an injection molding process, etc. In particular, the common geometric feature 304 of the development component 300 may be manufactured using the qualified manufacturing process determined for the common geometric feature 304. The common geometric feature 304 of the development component 300 may undergo a series of machining, finishing, and inspection steps during the qualified manufacturing process. The present disclosure is not limited to any particular manufacturing process or series of manufacturing processes.

In Step 220, manufacturing data 312 associated with manufacturing the common geometric feature 304 of the development component 300 may be collected and stored. The manufacturing data 312 associated with the common geometric feature 304 may be stored, for example, with the dataset 314 including the manufacturing data 312 for the common geometric feature 304 across the plurality of components 300 including the common geometric feature 304.

Steps 206-220 may be repeated for each geometric feature 302 of the development component 300. For example, the database 26 may be queried for each geometric feature 302 of the development component 300 to determine if the geometric feature 302 is a common geometric feature 304. For identified common geometric features 304 of the development component 300, previously collected and stored manufacturing data 312 may be used to qualify a manufacturing process for each common geometric feature 304 of the development component 300 while eliminating or reducing the need to conduct time consuming and expensive steps of conventional qualification processes.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A method for qualifying a manufacturing process for a first component including a common geometric feature, the method comprising:
   obtaining manufacturing data for the common geometric feature, the manufacturing data associated with one or more qualified second components, the one or more qualified second components different than the first component, each of the one or more qualified second components including the common geometric feature;
   modeling the manufacturing process for the common geometric feature of the one or more qualified second components using the manufacturing data;
   modeling the manufacturing process for the common geometric feature of the first component;
   obtaining manufacturing process parameters for the manufacturing process for the common geometric feature of the one or more qualified second components; and
   qualifying the manufacturing process for the common geometric feature of the first component, qualifying the manufacturing process including modifying the manufacturing process to include the manufacturing process parameters.

2. The method of claim 1, wherein the common geometric feature is a surface.

3. The method of claim 1, wherein the step of qualifying the manufacturing process for the common geometric feature includes determining one or both of a process capability (Cpk) or a process performance (Ppk) for the common geometric feature.

4. The method of claim 1, further comprising indexing the common geometric feature in a database by assigning the common geometric feature a unique identification code.

5. The method of claim 4, further comprising storing the manufacturing data associated with the common geometric feature of the one or more qualified second components as a dataset in the database and assigning the unique identification code to the dataset.

6. The method of claim 1, further comprising manufacturing the first component by applying the qualified manufacturing process to the common geometric feature of the first component.

7. The method of claim 6, further comprising collecting the manufacturing data for the at least one geometric feature of the first component manufactured using the qualified manufacturing process.

8. The method of claim 1, further comprising establishing physics equivalence between modeled manufacturing process for the common geometric feature of the first component the modeled manufacturing process for the common geometric feature of the one or more qualified second components.

9. The method of claim 1, wherein the manufacturing process includes one or more of a turning process, a milling process, a grinding process, a drilling process, a broaching process, a gear cutting process, or a wire electrical discharge machining (WEDM) process.

10. A non-transitory, computer-readable medium comprising instructions, which when executed by a computing device, cause the computing device to perform operations comprising:
    obtaining manufacturing data for the common geometric feature, the manufacturing data associated with one or more qualified second components, the one or more qualified second components different than the first component, each of the one or more qualified second components including the common geometric feature;
    modeling the manufacturing process for the common geometric feature of the one or more qualified second components using the manufacturing data;
    modeling the manufacturing process for the common geometric feature of the first component;
    obtaining manufacturing process parameters for the manufacturing process for the common geometric feature of the one or more qualified second components; and
    qualifying the manufacturing process for the common geometric feature of the first component, qualifying the manufacturing process including modifying the manufacturing process to include the manufacturing process parameters.

11. The non-transitory, computer-readable medium of claim 10, wherein the common geometric feature is a surface.

12. The non-transitory, computer-readable medium of claim 10, wherein the operation of qualifying the manufacturing process for the common geometric feature includes determining one or both of a process capability (Cpk) or a process performance (Ppk) for the common geometric feature.

13. The non-transitory, computer-readable medium of claim 10, wherein the instructions further cause the computing device to perform operations including indexing the common geometric feature in a database by assigning the common geometric feature a unique identification code.

14. The non-transitory, computer-readable medium of claim 13, wherein the instructions further cause the computing device to perform operations including storing the manufacturing data associated with the common geometric feature of the one or more qualified second components as a dataset in the database and assigning the unique identification code to the dataset.

15. The non-transitory, computer-readable medium of claim 10, wherein the instructions further cause the computing device to perform operations including establishing physics equivalence between modeled manufacturing process for the common geometric feature of the first component the modeled manufacturing process for the common geometric feature of the one or more qualified second components.

16. A method for qualifying a manufacturing process for a first component including at least one common geometric feature, the method comprising:
   storing manufacturing data for the common geometric feature in a database and indexing the manufacturing data with the at least one common geometric feature using a unique identification code;
   defining the first component using a three-dimensional component CAD model, the three-dimensional component CAD model including the common geometric feature;
   identifying the manufacturing data for the common geometric feature of the first component using the unique identification code for the common geometric feature;
   modeling the manufacturing process using the manufacturing data;
   modeling the manufacturing process for the at least one common geometric feature of the first component;
   establishing physics equivalence between modeled manufacturing process for the common geometric feature of the first component the modeled manufacturing process using the manufacturing data;
   obtaining manufacturing process parameters from the manufacturing data; and
   qualifying the manufacturing process for the common geometric feature of the first component, qualifying the manufacturing process including modifying the manufacturing process to include the manufacturing process parameters.

17. The method of claim 16, wherein the manufacturing data includes one or more of on-machine measurement data, process monitoring data, or quality inspection data.

18. The method of claim 16, wherein the step of qualifying the manufacturing process for the common geometric feature includes determining one or both of a process capability (Cpk) or a process performance (Ppk) for the common geometric feature.

19. The method of claim 16, further comprising storing the manufacturing data associated with the common geometric feature of the one or more qualified second components as a dataset in the database and assigning the unique identification code to the dataset.

20. The method of claim 16, wherein defining the first component using the three-dimensional component CAD model includes generating a CAD-based surface representation of the common geometric feature and assigning the unique identification code to the CAD-based surface representation.

* * * * *